US012607527B2

(12) United States Patent (10) Patent No.: US 12,607,527 B2

Ono (45) Date of Patent: Apr. 21, 2026

(54) COUPLING STRUCTURE FOR ELECTRODE PAD

(71) Applicant: SUBARU CORPORATION, Tokyo (JP)

(72) Inventor: Tsubasa Ono, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 333 days.

(21) Appl. No.: 18/682,067

(22) PCT Filed: Jun. 29, 2022

(86) PCT No.: PCT/JP2022/026040

§ 371 (c)(1),
(2) Date: Feb. 7, 2024

(87) PCT Pub. No.: WO2024/004097

PCT Pub. Date: Jan. 4, 2024

(65) Prior Publication Data

US 2024/0353274 A1 Oct. 24, 2024

(51) Int. Cl.
*G01L 1/22* (2006.01)
*G01B 7/16* (2006.01)

(52) U.S. Cl.
CPC .............. *G01L 1/2293* (2013.01); *G01B 7/18* (2013.01)

(58) Field of Classification Search
CPC ............ G01L 1/2293; G01B 7/18; G01B 7/16
See application file for complete search history.

(56) References Cited

U.S. PATENT DOCUMENTS

| | | | | |
|---|---|---|---|---|
| 5,192,938 | A * | 3/1993 | Ort ........................... | G01B 7/20 |
| | | | | 73/776 |
| 5,404,124 | A * | 4/1995 | Ruppin .................... | G01B 7/20 |
| | | | | 338/5 |
| 9,562,802 | B2 * | 2/2017 | Head ..................... | G01G 3/1402 |
| 12,379,268 | B2 * | 8/2025 | Ono ......................... | G01B 7/20 |
| 2015/0021105 | A1 * | 1/2015 | Head ........................ | G01L 1/205 |
| | | | | 177/211 |
| 2020/0393234 | A1 | 12/2020 | Misaizu et al. | |
| 2024/0385062 | A1 * | 11/2024 | Ono ......................... | G01L 1/22 |

FOREIGN PATENT DOCUMENTS

| | | |
|---|---|---|
| JP | 2019-074454 A | 5/2019 |
| JP | 2019-090722 A | 6/2019 |

OTHER PUBLICATIONS

International Search Report (ISR) (PCT Form PCT/ISA/210), in PCT/JP2022/026040, dated Sep. 20, 2022 (English, and Japanese versions).

* cited by examiner

*Primary Examiner* — Freddie Kirkland, III

(74) *Attorney, Agent, or Firm* — McGinn IP Law Group, PLLC

(57) ABSTRACT

A coupling structure for an electrode pad is configured to electrically couple the electrode pad, to which a gauge lead is coupled, to a tab of a strain gauge disposed on an elastic body and including a gauge grid and the tab. The coupling structure has an insert structure in which one of the tab and the electrode pad is partially or entirely inserted into the other.

7 Claims, 4 Drawing Sheets

COUPLING STRUCTURE FOR ELECTRODE PAD

CROSS-REFERENCE TO RELATED APPLICATIONS

This application is the U.S. National Phase under 35 U.S.C. § 371 of International Application No. PCT/JP2022/026040, filed on Jun. 29, 2022.

TECHNICAL FIELD

The present disclosure relates to a coupling structure for an electrode pad of a strain gauge.

BACKGROUND ART

A load cell using a strain gauge in which a resistance value changes due to a strain caused by a load is widely used. For example, a load cell is known in which a strain gauge is incorporated in a bridge circuit, which is a conversion circuit that converts a change in resistance value of the strain gauge due to a load into an electric signal, and the change in resistance value is output as the electric signal. In such a load cell, the strain gauge disposed on an elastic body is incorporated in the bridge circuit by forming an electrode pad as an extraction electrode on a tab of the strain gauge and by soldering a gauge lead to the electrode pad.

As the strain gauge, a metal or alloy foil strain gauge having a gauge factor of about 2 has been conventionally used in many cases. However, it is desirable to increase the gauge factor of the strain gauge in a load cell having a large output, for example, a force detection sensor that is provided on an axle of an automobile and detects a load applied to a wheel, or a load cell that detects component forces and has a large difference in sensitivity for each component force. As a strain gauge having a large gauge factor, PTLs 1 and 2 each disclose a strain gauge containing chromium nitride (Cr—N) as a main material.

CITATION LIST

Patent Literature

PTL 1: Japanese Unexamined Patent Application Publication No. 2019-074454
PTL 2: Japanese Unexamined Patent Application Publication No. 2019-090722

SUMMARY OF INVENTION

Technical Problem

In a case where a strain gauge made of nitrogen and chromium as main materials is used, when the temperature of the strain gauge rises, a phenomenon may occur in which the strain gauge partially becomes ceramic. In contrast, a metal material is generally used for the electrode pad. Thus, when high-temperature heat is applied to the electrode pad and the tab of the strain gauge, for example, when a gauge lead is soldered to the strain gauge, the thermal expansion coefficient of the material of the electrode pad and the thermal expansion coefficient of the material of the strain gauge are significantly different from each other, and a tensile stress or a compressive stress is applied to the tab in accordance with expansion of the electrode pad. As a result, cracking of the tab or peeling of the tab from the elastic body may occur, and the electric circuit may be partially damaged or disconnected.

The present disclosure is made in view of the above-described problem, and an object of the present disclosure is to provide a coupling structure for an electrode pad capable of suppressing cracking or peeling of a tab of a strain gauge and improving coupling reliability between the strain gauge and a gauge lead.

Solution to Problem

To address the above-described problem, according to an aspect of the present disclosure,
  a coupling structure for an electrode pad is configured to electrically couple the electrode pad, to which a gauge lead is coupled, to a tab of a strain gauge disposed on an elastic body and including a gauge grid and the tab, and
  the coupling structure has an insert structure in which one of the tab and the electrode pad is partially or entirely inserted into another of the tab and the electrode pad.

Advantageous Effects of Invention

As described above, according to the present disclosure, cracking or peeling of the tab of the strain gauge can be suppressed and the coupling reliability between the tab and the electrode pad can be improved.

BRIEF DESCRIPTION OF DRAWINGS

FIG. 3 is an explanatory diagram illustrating a configuration of a bridge circuit of the load cell of the present disclosure.
FIG. 4 is an explanatory view illustrating a coupling structure for an electrode pad according to a first embodiment of the present disclosure.
FIG. 5 is a sectional view taken along line I-I in FIG. 4.

DESCRIPTION OF EMBODIMENTS

Figures 1, 2:
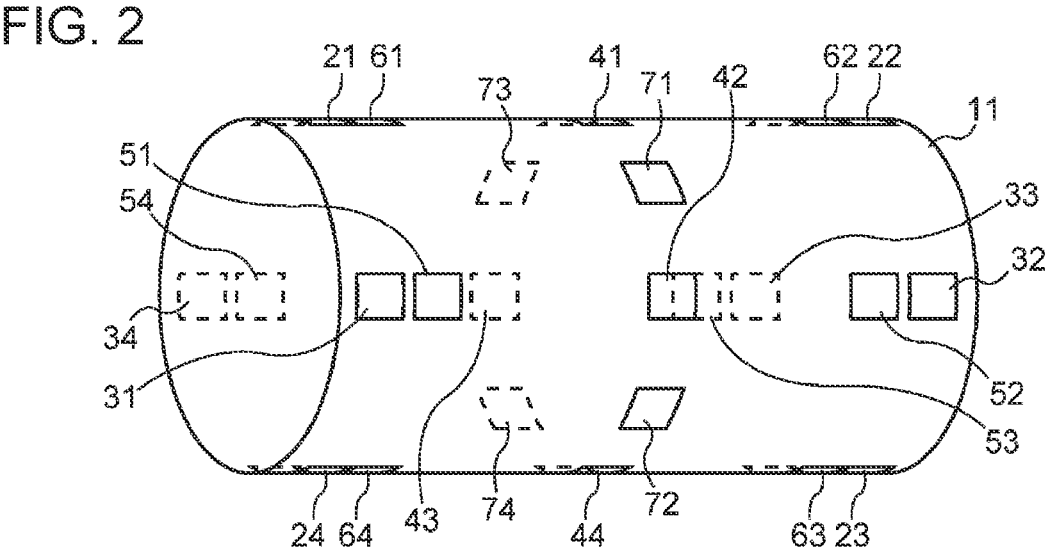
FIG. 1 is a sectional view illustrating a load cell (six-component force detector) of the present disclosure.
FIG. 2 is a schematic view illustrating a disposition of strain gauges in the load cell of the present disclosure.

Hereinafter, embodiments of the present disclosure will be described in detail with reference to the accompanying drawings. In the description and the drawings, components having substantially the same functions and configurations are denoted by the same reference numerals, and redundant description thereof will be omitted.

1. Overview of Embodiment of Present Disclosure

1-1. Details of Background of Present Disclosure

First, a background in which the technique of the present disclosure is created will be described. The background described below merely presents an aspect of a configuration of a load cell to which the technique of the present disclosure can be applied. The load cell to which the present disclosure can be applied is not limited to the load cell having the configuration exemplified below.

There is known a six-component force detector that detects, as loads applied to a wheel of a vehicle such as an automobile, loads (Fx, Fy, Fz) in a front-rear direction (hereafter also referred to as an "x-axis direction"), a vehicle width direction (hereafter also referred to as a "y-axis direction"), and a height direction (hereafter also referred to as a "z-axis direction") of the vehicle, and moments (Mx, My, Mz) around the x-axis, the y-axis, and the z-axis. Such a six-component force detector has a cylindrical elastic body attached to an axle. However, with regard to resistance to an applied load, it is difficult to obtain an output equivalent to that of a load cell that detects a load in a one-axis direction with a general foil strain gauge having a gauge factor of about 2.

In contrast, it is considered that a desirable output can be obtained by using a thin-film strain gauge such as a Cr—N gauge having a large element resistance value and a large gauge factor (for example, a gauge factor of 10 to 12 in the case of the Cr—N gauge). However, when high-temperature heat is applied to the Cr—N gauge, a phenomenon may occur in which the Cr—N gauge partially becomes ceramic and results in brittle fracture. As a material of the electrode pad to which solder is joined, a metal material is generally used with regard to the fact that an alloy is hardly formed between the metal material and the solder and that wettability between the solder and the material of the electrode pad is high.

When a gauge lead is soldered to the electrode pad, high-temperature heat is transferred to the electrode pad and to a tab of the strain gauge. In this case, the thermal expansion coefficient of the material of the electrode pad is significantly different from the thermal expansion coefficient of the material of the strain gauge. Thus, when the electrode pad made of a metal material expands, a tensile stress or a compressive stress acts on the tab, which may cause cracking of the tab or peeling of the tab from the elastic body. For example, in the six-component force detector that detects the load applied to the wheel, the strain gauge is disposed on the cylindrical elastic body, and hence the above-described cracking or peeling of the tab is likely to occur. Also, in the case of the six-component force detector, many coupling portions between the tabs and the electrode pads are provided, and when coupling failure occurs at even one portion, the six-component force detector becomes an abnormal product. Thus, it is desirable to increase reliability of each coupling portion.

In view of such a background, the technique of the present disclosure provides, in a case where a strain gauge having a gauge factor larger than that of a conventional foil strain gauge and being likely to be brittle-fractured is used, a coupling structure for an electrode pad capable of suppressing cracking of a tab or peeling of the tab from an elastic body which may occur when high-temperature heat is transferred to the electrode pad and the tab in the case of soldering or the like and improving coupling reliability between the strain gauge and a gauge lead.

1-2. Features of Embodiment of Present Disclosure (1-2-1) An embodiment of the present disclosure provides a coupling structure for an electrode pad configured to electrically couple the electrode pad, to which a gauge lead is coupled, to a tab of a strain gauge disposed on an elastic body and including a gauge grid and the tab, and the coupling structure has an insert structure in which one of the tab and the electrode pad is partially or entirely inserted into the other.

With this configuration, joining strength between the tab and the electrode pad can be increased. Even when the strain gauge is formed by using a material that is likely to be brittle-fractured, and even when high-temperature heat is applied in a case where the gauge lead is soldered to the electrode pad electrically coupled to the tab, or the like, cracking of the tab or peeling of the tab from the elastic body can be suppressed. Thus, coupling reliability between the strain gauge and the gauge lead can be increased.

The "insert structure in which one of the tab and the electrode pad is partially or entirely inserted into the other" indicates a state in which the other member is disposed partially or entirely on both sides of the one member of the tab or the electrode pad in a predetermined direction. However, such an insert structure does not include, for example, a configuration in which the other member is disposed on both sides in an extending direction of a plane of one member, such as a configuration in which the other member having a width exceeding the width of one member is disposed above the one member having a layer form and the one member is covered with the other member.

(1-2-2) Further, in the embodiment of the present disclosure, the electrode pad having a section of a U shape may be disposed on the elastic body so that an opening of the U shape is located on a lateral side, and the tab may be inserted into the electrode pad having the U shape.

With this configuration, upper and lower sides of the tab are inserted into the electrode pad, and the tab and the electrode pad are firmly joined. Thus, even when a thermal stress is generated in the tab, the joining state between the tab and the electrode pad is maintained, and coupling reliability between the strain gauge and the gauge lead can be increased.

(1-2-3) Further, in the embodiment of the present disclosure, the gauge grid may include straight-line portions each extending in a predetermined first direction, and both legs of the electrode pad having the U shape may extend in the first direction, and the tab may enter the electrode pad having the U shape in the first direction.

With this configuration, even when the straight-line portions of the gauge grid expand or contract due to the strain of the elastic body, the influence on the change in resistance due to the strain of the tab can be reduced. Thus, reliability of a measurement value of the load cell can be increased.

(1-2-4) Further, in the embodiment of the present disclosure, the tab may have long holes each having a longitudinal direction extending in a predetermined second direction and penetrating through the tab in a thickness direction of the tab or grooves recessed in the thickness direction of the tab, and the electrode pad may have a comb-like sectional shape, and comb teeth of the electrode pad may enter the long holes or the grooves.

With this configuration, one of the tab and the electrode pad is inserted into the other, so that the tab and the electrode pad are firmly joined. Thus, even when a thermal stress is generated in the tab, the joining state between the tab and the electrode pad is maintained, and coupling reliability between the strain gauge and the gauge lead can be increased.

(1-2-5) Further, in the embodiment of the present disclosure, in the coupling structure for the electrode pad according to claim 4, the gauge grid includes straight-line portions each extending in a predetermined first direction, and the second direction extends in a same direction as the first direction.

With this configuration, even when the straight-line portions of the gauge grid expand or contract due to the strain of the elastic body, the influence on the change in resistance due to the strain of the tab can be reduced. Thus, reliability of a measurement value of the load cell can be increased.

(1-2-6) Further, in the embodiment of the present disclosure, the strain gauge may be disposed on the elastic body with an insulating layer interposed, and the electrode pad may be formed in contact with the tab and the insulating layer.

With this configuration, the electrode pad is formed on the tab and in a range including the insulating layer, joining strength between the electrode pad and the insulating layer is increased, and hence joining strength between the electrode pad and the tab can be further increased.

(1-2-7) Further, in the embodiment of the present disclosure, the strain gauge may be made of Cr—N and the electrode pad may be made of Au.

With this configuration, a large output can be obtained from the load cell by using the strain gauge having a large gauge factor. Also, formation of an alloy by the solder and the electrode pad is suppressed, wettability between the solder and the electrode pad is excellent, and hence stability of the joining of the solder is improved. Further, the linear thermal expansion coefficient is brought close to the linear thermal expansion coefficient of the solder, so that the thermal stress generated in the strain gauge can be reduced.

2. Details of Embodiments of Present Disclosure

Hereinafter, a configuration example of a load cell to which a coupling structure for an electrode pad of each embodiment (described later) is applied will be described,

2-1. Configuration Example of Load Cell (Six-component Force Detector)

Next, a configuration example of a load cell according to an embodiment of the present disclosure will be described.

In the present embodiment, an example in which the technique of the present disclosure is applied to a six-component force detector capable of detecting six component forces (Fx, Fy, Fz, Mx, My, and Mz) applied to a wheel of a vehicle will be described as an aspect of a load cell. The load cell according to the present embodiment is a six-component force detector that detects six component forces applied to a wheel, and is incorporated in a hub bearing unit that is attached to a suspension device and rotatably supports a wheel of a vehicle such as an automobile.

FIG. 1 is a sectional view of a hub bearing unit including a six-component force detector, taken along a plane including an axle. In FIG. 1, a right side indicates an outer side in the vehicle width direction, and a left side indicates an inner side in the vehicle width direction. The configuration of the hub bearing unit illustrated in FIG. 1 is merely an example, and the configuration of the hub bearing unit is not limited to the configuration illustrated in FIG. 1.

A hub bearing unit 100 includes a hub 110, an outer tube 120, an inner tube 130, a rolling body 140, a base member 150, and a six-component force detector 1. The hub 110 is a member to which a rim disk of a wheel (not illustrated) including a rim and a tire is fastened. The hub 110 includes a tubular portion 111, a flange 112, and a collar 113 that are formed as a unit.

The tubular portion 111 has a cylindrical shape concentric with a rotation central axis (axle) of the wheel. The tubular portion 111 is inserted radially inward of the inner tube 130, a sensitive body 10, and the base member 150. A spline hole 111a into which a spline shaft of a drive shaft (not illustrated) is fitted is formed in a region of an inner peripheral surface portion of the tubular portion 111 on the outer side in the vehicle width direction. The flange 112 is a disk-shaped portion extending radially outward in a flat-edge shape from an end portion of the tubular portion 111 on the outer side in the vehicle width direction. A surface portion of the flange 112 on the outer side in the vehicle width direction serves as a base member to which the rim disk is fastened. The flange 112 has, for example, about five openings 112a into which hub bolts are inserted at circumferentially equal intervals on a predetermined pitch circle. The collar 113 is a cylindrical portion that protrudes from a surface portion of the flange 112 on the outer side in the vehicle width direction and is concentric with the axle. The collar 113 is fitted into a center bore that is a circular opening formed in a central portion of the rim disk, thereby improving attachment accuracy of the wheel.

The outer tube 120, the inner tube 130, and the rolling body 140 define a rolling bearing (hub bearing) that rotatably supports the wheel cooperatively. The outer tube 120 includes a tubular portion 121 and a flange 122 that are formed as a unit. The tubular portion 121 is a cylindrical portion concentric with the axle. A guide surface that guides the rolling body 140 is formed on an inner peripheral surface of the tubular portion 121. An end portion of the tubular portion 121 on the inner side in the vehicle width direction extends on the inner side in the vehicle width direction with respect to an end portion of a tubular portion 131 of the inner tube 130 on the inner side in the vehicle width direction.

The flange 122 extends radially outward in a flat-edge shape from an end portion of the tubular portion 121 on the outer side in the vehicle width direction. The flange 122 is a portion to which the flange 112 of the hub 110 is fastened and fixed. A surface portion of the flange 122 on the outer side in the vehicle width direction is in contact with a surface portion of the flange 112 of the hub 110 on the inner side in the vehicle width direction. The flange 122 has a screw hole 122a formed concentrically with the opening 112a of the hub 110. A hub bolt (not illustrated) used for fixing the wheel is fastened to the screw hole 122a.

The inner tube 130 includes the tubular portion 131 and a flange 132 that are formed as a unit. The tubular portion 131 is a cylindrical member concentric with the axle, and is inserted radially inward of the tubular portion 121 of the outer tube 120. A predetermined gap is provided between an outer peripheral surface of the tubular portion 131 and the inner peripheral surface of the tubular portion 121 of the outer tube 120. A guide surface that guides the rolling body 140 is formed on the outer peripheral surface of the tubular portion 131. The flange 132 extends radially inward from an end portion of the tubular portion 131 on the outer side in the vehicle width direction. The flange 132 holds an end portion of a first flange 12 of the sensitive body 10 on the outer side in the vehicle width direction. The rolling body 140 is a bearing incorporated between the guide surfaces of the outer tube 120 and the inner tube 130. The rolling body 140 is incorporated between the outer tube 120 and the inner tube 130 together with a holder 141 and a holder 142 that position the rolling body 140 between the outer tube 120 and the inner tube 130.

The base member 150 is a portion that fastens and fixes the hub bearing unit 100 to an upright (hub knuckle) (not illustrated) of a suspension device. The base member 150 includes a tubular portion 151, a flange 152, a recess 153, and a protrusion 154 that are formed as a unit. The tubular portion 151 is a cylindrical member concentric with the axle. An end portion of the tubular portion 111 of the hub 110 on the inner side in the vehicle width direction is inserted into the tubular portion 151. An outer peripheral surface of the tubular portion 111 of the hub 110 is disposed to face an inner peripheral surface of the tubular portion 151 with a predetermined gap radially interposed.

The flange 152 extends radially outward in a flat-edge shape from an end portion of the tubular portion 151 on the outer side in the vehicle width direction. The flange 152 is a fastening surface portion that fastens the base member 150 to the upright (not illustrated). The flange 152 has openings 152a, into which bolts used for fastening to the upright are inserted, to be circumferentially distributed. The flange 152 has therein a through hole 152b in which a wire or the like coupled to the strain gauge is disposed, from the inside of a space in which an outer peripheral surface of a cylindrical portion 11 of the sensitive body 10 is disposed to an outer peripheral edge portion of the flange 152.

The recess 153 is a portion of an inner peripheral surface of the base member 150. The recess 153 is formed by enlarging the inner diameter of a region corresponding to the flange 152 in the axial direction in a stepped manner. The recess 153 is a portion that holds a second flange 13 of the sensitive body 10. The protrusion 154 is a cylindrical portion protruding on the outer side in the vehicle width direction from a radially intermediate portion of the flange 152. An outer peripheral surface of the protrusion 154 is disposed to face an inner peripheral surface of the end portion of the tubular portion 121 of the outer tube 120 on the inner side in the vehicle width direction with a gap radially interposed.

The six-component force detector 1 is a load cell capable of detecting loads in orthogonal three axis directions and moments around the orthogonal three axes acting on the wheel. The six-component force detector 1 includes the substantially cylindrical sensitive body 10, strain gauges provided on the sensitive body 10, and a bridge circuit including the strain gauges.

The sensitive body (sensor core) 10 includes the cylindrical portion 11, the first flange 12, and the second flange 13. The cylindrical portion 11 is a portion having a cylindrical shape whose inner diameter and outer diameter are substantially constant over a predetermined length in the axial direction, and is a portion to which strain gauges (described later) are attached (bonded). The first flange 12 is provided at an end portion of the cylindrical portion 11 on the outer side in the vehicle width direction, and is a portion extending radially outward and inward with respect to the cylindrical portion 11. The first flange 12 is fixed to the inner tube 30 in a state in which an outer peripheral surface of the first flange 12 abuts on an inner peripheral surface of the tubular portion 131 of the inner tube 30 in the vicinity of the end portion of the tubular portion 131 on the outer side in the vehicle width direction and an end surface of the first flange 12 abuts on a surface portion of the flange 132 on the inner side in the vehicle width direction.

The second flange 13 is a portion provided at an end portion of the cylindrical portion 11 on the inner side in the vehicle width direction, and extending radially outward and inward with respect to the cylindrical portion 11. The second flange 13 is fixed to the base member 150 in a state in which an outer peripheral surface and an end surface of the second flange 13 are fitted into the recess 153 of the base member 150. With this configuration, substantially all of the forces acting on the wheel are transferred to the base member 150 via the sensitive body 10.

The six-component force detector 1 includes an Fx detection system, an Fy detection system, an Fz detection system, an Mx detection system, an My detection system, and an Mz detection system each having a bridge circuit including a strain gauge provided on the cylindrical portion 11 of the above-described sensitive body 10. The Fx detection system detects a force Fx in the radial direction (x-axis direction) acting on the cylindrical portion 11 of the sensitive body 10. The Fy detection system detects a force Fy in the axial direction (y-axis direction) acting on the cylindrical portion 11 of the sensitive body 10. The Fz detection system detects a force Fz in the radial direction (z-axis direction) orthogonal to the x-axis direction acting on the cylindrical portion 11 of the sensitive body 10. The Mx detection system detects a moment Mx around the x-axis acting on the cylindrical portion 11 of the sensitive body 10. The My detection system detects a moment My around the y-axis acting on the cylindrical portion 11 of the sensitive body 10. The Mz detection system detects a moment Mz around the z-axis acting on the cylindrical portion 11 of the sensitive body 10.

Figures 3, 4, 5:
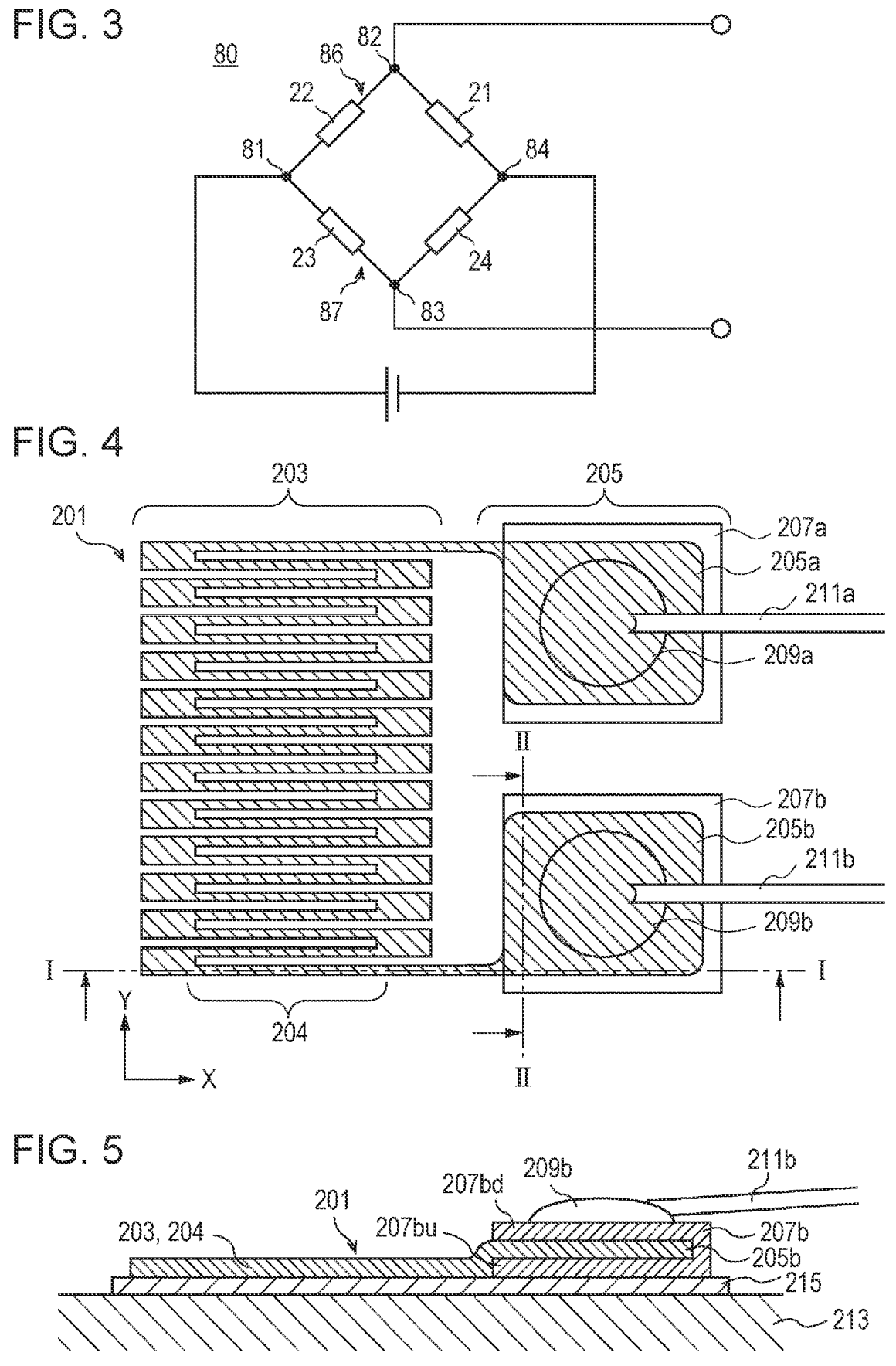

Each of the Fx detection system, the Fy detection system, the Fz detection system, the Mx detection system, the My detection system, and the Mz detection system described above includes a bridge circuit including four strain gauges. FIG. 2 is a schematic view illustrating a disposition of the strain gauges in the six-component force detector 1. FIG. 3 is a diagram illustrating a disposition of the strain gauges and a configuration of the bridge circuit of the Fx detection system in the six-component force detector 1, and illustrates a representative example of the disposition of the strain gauges and the configuration of the bridge circuit of each force detection system (Fx detection system, Fy detection system, Fz detection system) and each moment detection system (Mx detection system, My detection system, Mz detection system).

As illustrated in FIGS. 2 and 3, the Ex detection system includes strain gauges 21 to 24. The strain gauges 21 to 24 are one-axis strain gauges, and are attached to an outer peripheral surface of the cylindrical portion 11 so that the detection directions thereof are parallel to the central axis direction of the cylindrical portion 11. The strain gauge 21 is disposed in a region of the outer peripheral surface of the cylindrical portion 11 on the first flange 12 side (a region close to an intermediate portion 14). The strain gauge 22 is disposed on a straight line that passes through the strain gauge 21 and is parallel to the axial direction of the cylindrical portion 11, and is disposed in a region of the outer peripheral surface of the cylindrical portion 11 on the second flange 13 side (a region close to an intermediate portion 15). The strain gauge 23 is disposed at a position shifted by 180 degrees around the central axis of the cylindrical portion 11 as viewed from the strain gauge 22 (a position symmetrical to the strain gauge 22 with respect to the central axis of the cylindrical portion 11). The strain gauge 24 is disposed at a position shifted by 180 degrees around the central axis of the cylindrical portion 11 as viewed from the strain gauge 21 (a position symmetrical to the strain gauge 21 with respect to the central axis of the cylindrical portion 11).

As illustrated in FIG. 3, the bridge circuit of the Ex detection system is configured as a Wheatstone bridge circuit, the strain gauges 21 to 24 are sequentially coupled in a loop shape, and a positive electrode and a negative electrode of a power supply are coupled between the strain gauge 22 and the strain gauge 23 and between the strain gauge 21 and the strain gauge 24, respectively. The bridge circuit extracts a potential difference between a terminal between the strain gauge 21 and the strain gauge 22 and a terminal between the strain gauge 23 and the strain gauge 24 as an output. The configuration of the bridge circuit will be described in detail later.

The Fy detection system includes strain gauges 41 to 44. The strain gauges 41 to 44 are one-axis strain gauges, and are attached to the outer peripheral surface of the cylindrical portion 11 so that the detection directions thereof are parallel to the central axis direction of the cylindrical portion 11. The strain gauge 41 is disposed between the strain gauges 21 and 22 of the Ex detection system. The strain gauges 42, 43, and 44 are disposed at positions at which phases of the strain gauges 42, 43, and 44 around the central axis of the cylindrical portion 11 are shifted by 90 degrees, 180 degrees, and 270 degrees, respectively, with respect to the phase of the strain gauge 41. The bridge circuit of the Fy detection system has the same configuration except that the strain gauges 21 to 24 of the Ex detection system illustrated in FIG. 3 are replaced with the strain gauges 41 to 44.

The Fz detection system includes strain gauges 31 to 34. The strain gauges 31 to 34 are one-axis strain gauges, and are attached to the outer peripheral surface of the cylindrical portion 11 so that the detection directions thereof are parallel to the central axis direction of the cylindrical portion 11. The strain gauge 31 is disposed to be shifted by 90 degrees around the central axis of the cylindrical portion 11 with respect to the strain gauge 21 of the Fx detection system. The strain gauge 32 is disposed to be shifted by 90 degrees around the central axis of the cylindrical portion 11 with respect to the strain gauge 22 of the Ex detection system. The strain gauge 31 and the strain gauge 32 are disposed on the same straight line parallel to the axial direction of the cylindrical portion 11. The strain gauge 33 is disposed at a position shifted by 180 degrees around the central axis of the cylindrical portion 11 as viewed from the strain gauge 32 (a position symmetrical to the strain gauge 32 with respect to the central axis of the cylindrical portion 11). The strain gauge 34 is disposed at a position shifted by 180 degrees around the central axis of the cylindrical portion 11 as viewed from the strain gauge 31 (a position symmetrical to the strain gauge 31 with respect to the central axis of the cylindrical portion 11). The bridge circuit of the Fz detection system has the same configuration except that the strain gauges 21 to 24 of the Fx detection system illustrated in FIG. 3 are replaced with the strain gauges 31 to 34.

The Mx detection system includes strain gauges 51 to 54. The strain gauges 51 to 54 are one-axis strain gauges, and are attached to the outer peripheral surface of the cylindrical portion 11 so that the detection directions thereof are parallel to the central axis direction of the cylindrical portion 11. The strain gauge 51 is disposed adjacent to the strain gauge 31 of the Fz detection system in the central axis direction of the cylindrical portion 11. The strain gauge 52 is disposed adjacent to the strain gauge 32 of the Fz detection system in the central axis direction of the cylindrical portion 11. The strain gauge 51 and the strain gauge 52 are disposed on the same straight line parallel to the axial direction of the cylindrical portion 11. The strain gauge 53 is disposed at a position shifted by 180 degrees around the central axis of the cylindrical portion 11 as viewed from the strain gauge 52 (a position symmetrical to the strain gauge 52 with respect to the central axis of the cylindrical portion 11). The strain gauge 54 is disposed at a position shifted by 180 degrees around the central axis of the cylindrical portion 11 as viewed from the strain gauge 51 (a position symmetrical to the strain gauge 51 with respect to the central axis of the cylindrical portion 11). The bridge circuit of the Mx detection system has the same configuration except that the strain gauges 21 to 24 of the Fx detection system illustrated in FIG. 3 are replaced with the strain gauges 51 to 54.

The My detection system includes strain gauges 71 to 74. The strain gauges 71 to 74 are shear strain gauges, and are attached to the outer peripheral surface of the cylindrical portion 11 so that the detection directions thereof are the circumferential direction of the cylindrical portion 11. The strain gauge 71 is disposed between the strain gauges 41 and 42 of the Fy detection system. The strain gauge 72 is disposed between the strain gauges 42 and 44 of the Fy detection system. The strain gauges 73 and 74 are disposed at positions symmetrical to the strain gauges 72 and 71, respectively, with respect to the central axis of the cylindrical portion 11. The bridge circuit of the My detection system has the same configuration except that the strain gauges 21 to 24 of the Fx detection system illustrated in FIG. 3 are replaced with strain gauges 61 to 64.

The Mz detection system includes the strain gauges 61 to 64. The strain gauges 61 to 64 are one-axis strain gauges, and are attached to the outer peripheral surface of the cylindrical portion 11 so that the detection directions thereof are parallel to the central axis direction of the cylindrical portion 11. The strain gauge 61 is disposed adjacent to the strain gauge 21 of the Fx detection system in the central axis direction of the cylindrical portion 11. The strain gauge 62 is disposed adjacent to the strain gauge 22 of the Fx detection system in the central axis direction of the cylindrical portion 11. The strain gauge 61 and the strain gauge 62 are disposed on the same straight line parallel to the axial direction of the cylindrical portion 11. The strain gauge 63 is disposed at a position shifted by 180 degrees around the central axis of the cylindrical portion 11 as viewed from the strain gauge 62 (a position symmetrical to the strain gauge 62 with respect to the central axis of the cylindrical portion 11). The strain gauge 64 is disposed at a position shifted by 180 degrees around the central axis of the cylindrical portion 11 when viewed from the strain gauge 61 (a position symmetrical to the strain gauge 61 with respect to the central axis of the cylindrical portion 11). The bridge circuit of the Mz detection system has the same configuration except that the strain gauges 21 to 24 of the Fx detection system illustrated in FIG. 3 are replaced with the strain gauges 61 to 64.

2-2. Bridge Circuit

Next, a configuration example of a bridge circuit of each force detection system and each moment detection system will be briefly described with reference to FIG. 3.

A bridge circuit 80 of the Fx detection system illustrated in FIG. 3 has four terminals including a first terminal 81, a second terminal 82, a third terminal 83, and a fourth terminal 84, and the four strain gauges 21, 22, 23, and 24. The strain gauge 21 is provided between the first terminal 81 and the second terminal 82, and the strain gauge 22 is provided between the second terminal 82 and the fourth terminal 84. The strain gauge 24 is provided between the first terminal 81 and the third terminal 83, and the strain gauge 23 is provided between the third terminal 83 and the fourth terminal 84. A current path passing through the first terminal 81, the strain gauge 21, the second terminal 82, the strain gauge 22, and the fourth terminal 84 defines a first path 86. A current path passing through the first terminal 81, the strain gauge 24, the third terminal 83, the strain gauge 23, and the fourth terminal 84 defines a second path 87.

The strain gauges 21, 22, 23, and 24 are resistance elements whose resistance values change in accordance with the amount of strain. In the present embodiment, the strain gauge is made of a material having a gauge factor of 4 or more. For example, the strain gauge may be formed of a Cr—N thin film. When the gauge factor of the strain gauge is 4 or more, a desirable output as the six-component force detector 1 that detects the load applied to the wheel can be obtained. However, the strain gauge is not limited to the strain gauge of the Cr—N thin film.

In the bridge circuit 80, one or more of the sides on which the strain gauges 21, 22, 23, 24 are disposed may be coupled to a resistance element for adjusting initial balance of resistance values or a resistance element for compensating for temperature characteristics in which the output of the bridge circuit 80 changes with a change in temperature.

In the bridge circuit 80, when a load is applied to an elastic body, a strain occurs in each of the strain gauges 21, 22, 23, and 24, and the resistance value of each of the strain gauges 21, 22, 23, and 24 changes in accordance with the amount of strain. The bridge circuit 80 outputs an electric signal corresponding to a potential difference between the second terminal 82 of the first path 86 and the third terminal 83 of the second path 87.

2-3. Embodiment of Coupling Structure for Electrode Pad

Next, each embodiment of the coupling structure for the electrode pad of the present disclosure will be described as an example.

2-3-1. First Embodiment

Figure 6:
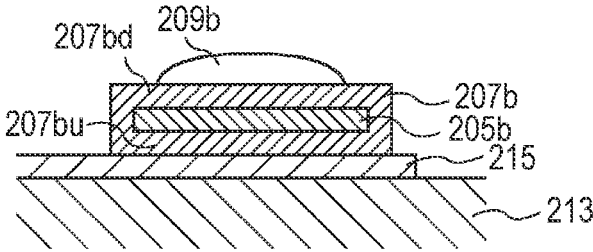
FIG. 6 is a sectional view taken along line II-II in FIG. 4.

FIGS. 4 to 6 are explanatory views illustrating a coupling structure for an electrode pad according to a first embodiment of the present disclosure. FIG. 4 is a plan view illustrating one strain gauge disposed on an elastic body. FIG. 5 is a sectional view taken along line I-I in FIG. 4, and FIG. 6 is a sectional view taken along line II-II in FIG. 4.

A strain gauge 201 is disposed on an elastic body 213 with an insulating layer 215 interposed. The elastic body 213 is made of a material having a predetermined rigidity, such as iron or another metal, and corresponds to the cylindrical portion 11 in the above-described six-component force detector 1. The insulating layer 215 is made of an electrically insulating material, and electrically insulates the strain gauge 201 made of a Cr—N thin film or the like from the elastic body 213. When the elastic body 213 has a cylindrical shape or the like, the material of the insulating layer 215 is desirably a substance that can follow a portion other than a completely flat surface, such as a curved surface. For example, the insulating layer 215 may be a thin film formed using a polyester-based resin film, a polyimide-based resin film, or the like.

The strain gauge 201 includes a gauge grid 203 and a tab 205. The gauge grid 203 includes straight-line portions 204 extending in a predetermined first direction (X direction in the drawing). The straight-line portions 204 are arrayed in a direction (Y direction in the drawing) orthogonal to the first direction and are electrically coupled in series. The tab 205 includes a first tab 205a and a second tab 205b provided at both ends of the gauge grid 203 (hereafter, collectively referred to as a tab 205 unless otherwise distinguished). The tab 205 is located on the first direction (X direction) side with respect to the gauge grid 203.

The first tab 205a and the second tab 205b are electrically coupled to a first electrode pad 207a and a second electrode pad 207b, respectively (hereafter, collectively referred to as an electrode pad 207 unless otherwise distinguished). Gauge leads 211a and 211b are electrically coupled to the first electrode pad 207a and the second electrode pad 207b using solders 209a and 209b, respectively.

A coupling structure between the second tab 205b and the second electrode pad 207b will be described as an example. In the present embodiment, the second tab 205b has an insert structure in which the second tab 205b is inserted into the second electrode pad 207b. For example, the second electrode pad 207b has a section of a U shape taken along a plane extending in the first direction (X direction), and is disposed on the elastic body 213 so that the opening of the U shape is located on a lateral side on the gauge grid 203 side. That is, both legs (upper leg 207bu and lower leg 207bd) of the second electrode pad 207b having the U shape extend in the first direction (X direction). The second tab 205b is formed in a state in which the second tab 205b enters the second electrode pad 207b having the U shape in the first direction.

As illustrated in FIG. 6, in the present embodiment, the second electrode pad 207b has a rectangular-parallelepiped shape having a recess opened to the gauge grid 203 side, and is formed in a state in which the second tab 205b enters the recess.

Accordingly, the joining area in which the second tab 205b and the second electrode pad 207b are in contact with each other is increased as compared with a case where an electrode pad is simply stacked on a tab. Thus, the coupling between the second tab 205b and the second electrode pad 207b can be strengthened, and the possibility of disconnection due to insufficient adhesion or peeling can be reduced. Further, since the coupling between the second tab 205b and the second electrode pad 207b is strengthened, even when the temperature of the load cell changes, a decrease in electrical conductivity of the coupling portion between second tab 205b and the second electrode pad 207b can be prevented.

Also, since the second tab 205b enters the second electrode pad 207b in the first direction (X direction) in which the straight-line portions 204 of the gauge grid 203 extend, (the influence on the strain of the second tab 205b is reduced), detection accuracy for the amount of strain by the strain gauge 201 can be increased.

Also, the second electrode pad 207b is formed in contact with the second tab 205b and the insulating layer 215. Accordingly, the range of formation of the second electrode pad 207b is expanded as compared with a case where an electrode pad is stacked on a tab, and the possibility that the solder 209b protrudes from the second electrode pad 207b and comes into contact with the material of the strain gauge

201 can be reduced. Thus, the characteristics of the material of the strain gauge 201 can be prevented from changing upon application of high-temperature heat.

The material forming the second electrode pad 207b is desirably a material that is less likely to form an alloy with the solder when high-temperature heat is applied at the time of soldering or the like. This is because, when an alloy is formed, the electrical resistance value changes, which makes it difficult to adjust bridge balance. Also, the material forming the second electrode pad 207b is desirably a material that has good wettability with respect to the solder and with which the contact angle of the solder 209b joined onto the upper leg 207bu becomes smaller. This is because the smaller the contact angle of the solder 209b, the higher the stability of the joining of the solder 209b.

Further, the material forming the second electrode pad 207b is desirably selected with regard to the linear thermal expansion coefficient of the solder 209b. This is because, when the linear thermal expansion coefficient of the second electrode pad 207b is significantly larger than the linear thermal expansion coefficient of the solder 209b, the thermal stress generated by the transfer of high-temperature heat to the second electrode pad 207b at the time of soldering is increased, and the thermal stress applied to the second tab 205b may be increased by the thermal expansion of the second electrode pad 207b. The linear thermal expansion coefficient of general solder 209b is $20 \times 10^{-6}$/K to $22 \times 10^{-6}$/K, and hence the linear thermal expansion coefficient of the material of the second electrode pad 207b is desirably within a range of $30 \times 10^{-6}$/K.

For example, the material of the second electrode pad 207b may be Ag (linear thermal expansion coefficient: $19 \times 10^{-6}$/K), Cu (linear thermal expansion coefficient: $17 \times 10^{-6}$/K), or Au (linear thermal expansion coefficient: $14 \times 10^{-6}$/K). For example, the smaller the linear thermal expansion coefficient of the material of the second electrode pad 207b, the smaller the tensile stress or compressive stress that is generated in the second electrode pad 207b at the time of soldering, and the smaller the tensile stress or compressive stress that is applied to the second tab 205b. Thus, the material of the second electrode pad 207b is more desirably Au.

In the present embodiment, any one of the insulating layer 215, the strain gauge 201, and the electrode pad 207 (the first electrode pad 207a and the second electrode pad 207b), which define the coupling structure for the electrode pad, is formed using a thin film. That is, any one of the insulating layer 215, the strain gauge 201, and the electrode pad 207 is formed using a thin film formed by a stacking step of stacking a material to form a thin film, a development step of stacking a resist film on the formed thin film and then forming a desirable pattern by photolithography, and a patterning step of etching the thin film in a region not masked by the resist film to form a thin film having a desirable pattern.

For example, in the present embodiment, after the lower leg (207bd) of the electrode pad 207 having the section of the U shape is formed, the strain gauge 201 including the tab 205 is formed, and then the upper leg (207bu) of the electrode pad 207 is formed, so that the insert structure in which the tab 205 is inserted into the electrode pad 207 can be formed.

In the coupling structure for the electrode pad illustrated in FIG. 4, the tab 205 is entirely inserted into the electrode pad 207, but the tab 205 may be partially inserted into the electrode pad 207. Also, after the insulating layer 215, the strain gauge 201, and the electrode pad 207 are formed on the elastic body 213 and the gauge lead 211 is coupled to the electrode pad 207 using the solder 209, the resultant is covered with an electrically insulating protective film, but the protective film is not illustrated.

As described above, the coupling structure for the electrode pad according to the present embodiment has the insert structure in which the tab of the strain gauge is partially or entirely inserted into the electrode pad. Accordingly, the coupling between the tab and the electrode pad is strengthened, and occurrence of disconnection or conduction failure between the strain gauge and the electrode pad can be prevented. Also, in the coupling structure for the electrode pad according to the present embodiment, the possibility that the solder comes into contact with the strain gauge at the time of soldering is reduced, and occurrence of disconnection or conduction failure due to a change in the characteristics of the strain gauge can be prevented.

Further, with the coupling structure for the electrode pad according to the present embodiment, coupling reliability between the strain gauge and the gauge lead is improved, and it is possible to increase the yield at the time of manufacturing the six-component force detector in which ten or more strain gauges are disposed on the elastic body, and to increase reliability of the measurement result.

2-3-2. Second Embodiment

Figure 7:
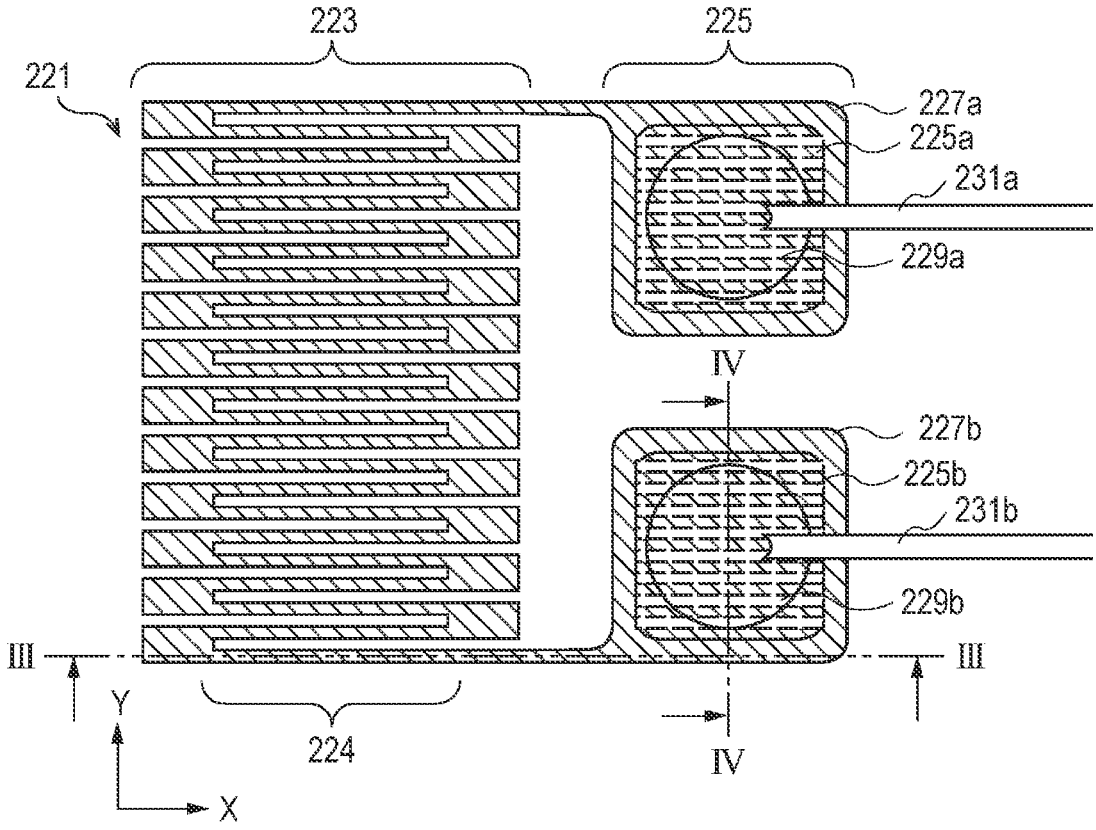
FIG. 7 is an explanatory view illustrating a coupling structure for an electrode pad according to a second embodiment of the present disclosure.
Figure 8:
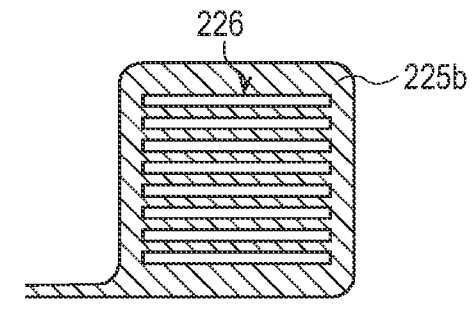
FIG. 8 is an explanatory view illustrating a configuration example of a tab according to the embodiment.
Figure 9:
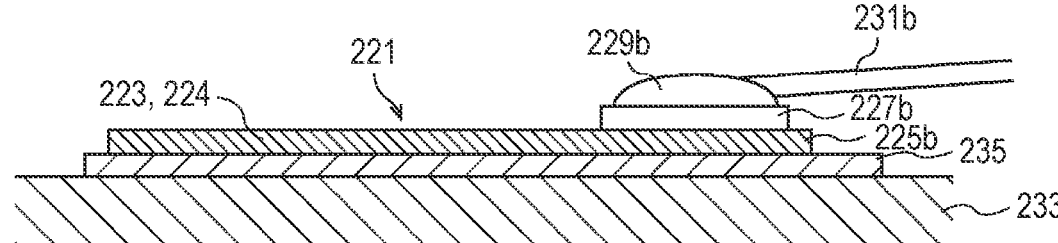
FIG. 9 is a sectional view taken along line III-III in FIG. 7.
Figure 10:
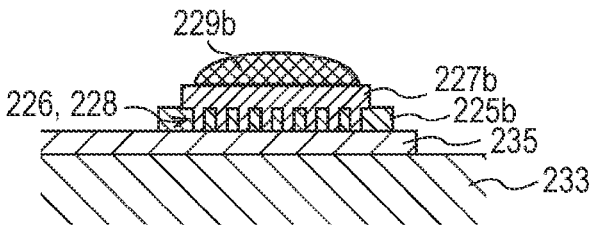
FIG. 10 is a sectional view taken along line IV-IV in FIG. 7.

FIGS. 7 to 10 are explanatory views illustrating a coupling structure for an electrode pad according to a second embodiment of the present disclosure. FIG. 7 is a plan view illustrating one strain gauge disposed on an elastic body, and FIG. 8 is a plan view illustrating a planar shape of a tab. FIG. 9 is a sectional view taken along line III-III in FIG. 7, and FIG. 10 is a sectional view taken along line IV-IV in FIG. 7.

Similarly to the strain gauge 201 of the first embodiment, a strain gauge 221 is disposed on an elastic body 233 with an insulating layer 235 interposed. The strain gauge 221 includes a gauge grid 223 and a tab 225. A first tab 225a and a second tab 225b are electrically coupled to a first electrode pad 227a and a second electrode pad 227b, respectively (hereafter, collectively referred to as an electrode pad 227 unless otherwise distinguished). Gauge leads 231a and 231b are electrically coupled to the first electrode pad 227a and the second electrode pad 227b using solders 229a and 229b, respectively.

A coupling structure between the second tab 225b and the second electrode pad 227b will be described as an example. In the present embodiment, an insert structure in which each of the second tab 225b and the second electrode pad 227b is partially inserted into the other is provided.

As illustrated in FIG. 8, the second tab 225b has long holes 226 each having a longitudinal direction extending in a predetermined second direction (X direction in the example in FIG. 8) and penetrating through the second tab 225b in a thickness direction thereof. Also, as illustrated in FIG. 10, the second electrode pad 227b has a comb-like sectional shape, and is formed in a state in which comb teeth enter the long holes 226 of the second tab 205b. That is, each of the comb teeth is formed so that the longitudinal direction thereof extends in the predetermined second direction (X direction in the example in FIG. 8).

Accordingly, the joining area in which the second tab 225b and the second electrode pad 227b are in contact with each other is increased as compared with a case where an electrode pad is simply stacked on a tab. Thus, the coupling between the second tab 225b and the second electrode pad 227b can be strengthened, and the possibility of disconnection due to insufficient adhesion or peeling can be reduced. Further, since the coupling between the second tab 225*b* and the second electrode pad 227*b* is strengthened, even when the temperature of the load cell changes, a decrease in electrical conductivity of the coupling portion between the second tab 225*b* and the second electrode pad 227*b* can be prevented.

The second direction in which the long holes 226 of the second tab 225*b* and the comb teeth of the second electrode pad 227*b* extend may be different from the first direction (X direction). However, when the second direction extends in the same direction as the first direction, (the influence on the strain of the second tab 225*b* is reduced), and detection accuracy for the amount of strain by the strain gauge 221 can be increased. The number of the long holes 226 and the number of the comb teeth are not limited to the illustrated example, and may be any number.

The material of the second electrode pad 227*b* may be selected in a manner similar to the material of the second electrode pad 227*b* of the first embodiment. Also, even in the present embodiment, any one of the insulating layer 235, the strain gauge 221, and the electrode pad 227 (the first electrode pad 227*a* and the second electrode pad 227*b*), which define the coupling structure for the electrode pad, is formed using a thin film. That is, any one of the insulating layer 235, the strain gauge 221, and the electrode pad 227 is formed using a thin film formed by a stacking step of stacking a material to form a thin film, a development step of stacking a resist film on the formed thin film and then forming a desirable pattern by photolithography, and a patterning step of etching the thin film in a region not masked by the resist film to form a thin film having a desirable pattern.

The coupling structure for the electrode pad according to the present embodiment described above can also provide effects similar to the effects of the coupling structure for the electrode pad according to the first embodiment. Instead of providing the long holes in the tab, the tab may be formed in a lattice shape, and the electrode pad may be partially inserted into gaps of the lattice to form an insert structure. Even with such an insert structure, the joining area between the tab and the electrode pad is increased, and the coupling between the tab and the electrode pad can be strengthened.

Although the desirable embodiments of the present disclosure have been described in detail with reference to the accompanying drawings, the present disclosure is not limited to such examples. It will be apparent to those skilled in the art to which the present disclosure pertains that various changes and modifications may be conceived without departing from the technical idea of the disclosure as defined by the appended claims. The changes and modifications obviously pertain to the technical scope of the present disclosure.

For example, in the above-described embodiment, the example in which the technique of the present disclosure is applied to, as the load cell, the six-component force detector that detects the load applied to the wheel has been described, but the target to which the technique of the present disclosure is applied is not limited to the six-component force detector. The technique of the present disclosure can be applied to various force detection sensors using a strain gauge.

Also, in the above-described embodiment, the example of the load cell using the one-axis strain gauge has been described, but the load cell to which the technique of the present disclosure can be applied is not limited to such an example. For example, the technique of the present disclosure can also be applied to a load cell using a two-axis shear strain gauge illustrated in FIGS. 11 and 12.

Figure 11:
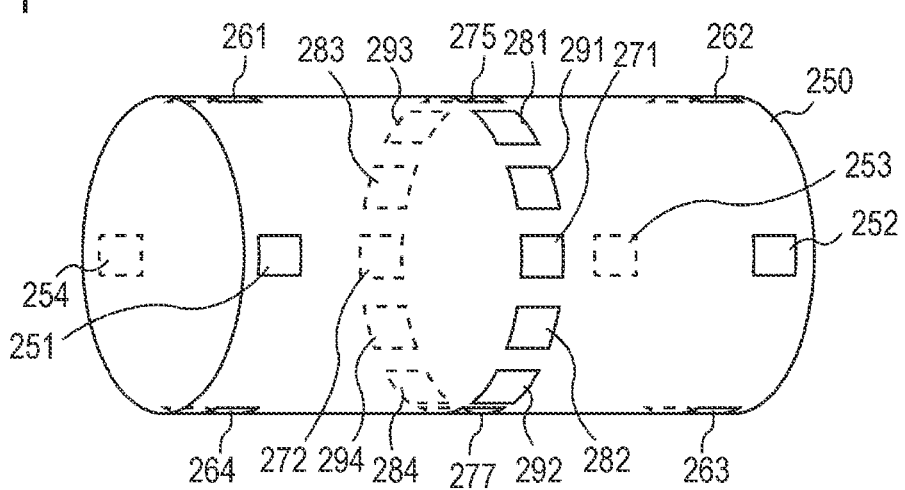
FIG. 11 is a schematic view illustrating a disposition of strain gauges in a six-component force detector of a modification.
Figure 12:
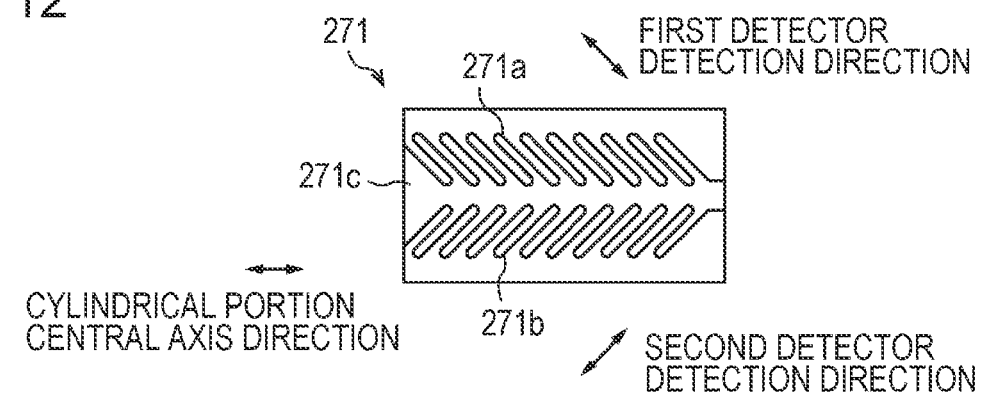
FIG. 12 is an explanatory view illustrating a gauge pattern of a two-axis shear strain gauge.

For example, FIG. 11 is a schematic view illustrating a disposition of strain gauges in a six-component force detector of a modification, and FIG. 12 is an explanatory view illustrating a gauge pattern of a two-axis shear strain gauge. The six-component force detector illustrated in FIG. 11 is provided with shear strain gauges 271 and 272 of the Fx detection system and shear strain gauges 275 and 277 of the Fz detection system, which will be described below, instead of the strain gauges 21 to 24 of the Fx detection system and the strain gauges 31 to 34 of the Fz detection system described above. FIG. 12 illustrates the shear strain gauge 271 as an example, but the shear strain gauges 272, 275, and 277 also have a substantially similar gauge pattern.

The shear strain gauge 271 has a so-called arrow-shaped two-axis (two-pole) structure. In the shear strain gauge 271, a first detector 271*a* and a second detector 271*b* made of a Cr—N thin film or the like are formed on a common insulating layer 271*c* that is a thin film of an insulating body. Each of the first detector 271*a* and the second detector 221*b* is formed by sequentially coupling straight-line portions disposed in parallel in respective detection directions in series. The first detector 271*a* and the second detector 271*b* are set so that the electric resistances thereof are likely to change in accordance with the strain in a direction (detection direction) in which straight-line portions expand or contract. The detection directions of the first detector 271*a* and the second detector 271*b* are set to be substantially orthogonal to each other. The shear strain gauge 271 is attached to an outer peripheral surface of a cylindrical portion 250 so that the detection directions of the first detector 271*a* and the second detector 271*b* are inclined in opposite directions by 45 degrees each with respect to the central axis direction of the cylindrical portion 250. The shear strain gauges 272, 275, and 277 are also similarly attached to the outer peripheral surface of the cylindrical portion 250.

As illustrated in FIG. 11, the shear strain gauges 271, 272, 275, and 277 are attached to the outer peripheral surface of a central portion of the cylindrical portion 250 in the central axis direction. The shear strain gauge 271 of the Fx detection system is disposed between strain gauges 251 and 252 of the Mx detection system. The shear strain gauge 272 of the Fx detection system is disposed between strain gauges 253 and 254 of the Mx detection system (at a position symmetrical to the shear strain gauge 271 with respect to the central axis). The shear strain gauge 275 of the Fz detection system is disposed between strain gauges 261 and 262 of the Mz detection system. The shear strain gauge 277 of the Fz detection system is disposed between strain gauges 263 and 264 of the Mz detection system (at a position symmetrical to the shear strain gauge 275 with respect to the central axis).

Also, strain gauges 281 to 284 of the Fy detection system and strain gauges 291 to 294 of the My detection system are disposed at shifted positions around the central axis to avoid interference with the strain gauges 271 and 272 of the Fx detection system and the strain gauges 275 and 277 of the Fz detection system. For example, as illustrated in FIG. 11, the shear strain gauge 271, the strain gauge 282, the strain gauge 292, the shear strain gauge 277, the strain gauge 284, the strain gauge 294, the shear strain gauge 272, the strain gauge 283, the strain gauge 293, the shear strain gauge 275, the strain gauge 281, and the strain gauge 291 may be sequentially disposed at positions shifted at intervals of 30 degrees around the central axis in the circumferential direction of the cylindrical portion 250.

A first detector and a second detector included in each of the shear strain gauges 271 and 272 of the Fx detection system define a bridge circuit similar to the bridge circuit illustrated in FIG. 3. The bridge circuit generates an output corresponding to an Fx-direction component force input to the sensitive body 250. Similarly, a first detector and a second detector included in each of the shear strain gauges 275 and 277 of the Fx detection system define a bridge circuit similar to the bridge circuit illustrated in FIG. 3. The bridge circuit generates an output corresponding to an Fz-direction component force input to the sensitive body 250.

The technique of the present disclosure can also be applied to the load cell using the two-axis shear strain gauge configured as described above, and the effects obtained by the above-described embodiment can be attained.

REFERENCE SIGNS LIST

21, 22, 23, 24: strain gauge, 80: bridge circuit, 201, 221: strain gauge, 203, 223: gauge grid, 204, 224: straight-line portion, 205, 225: tab, 205*a*, 225*a*: first tab, 205*b*, 225*b*: second tab, 207, 227: electrode pad, 207*a*, 227*a*: first electrode pad, 207*b*, 227*b*: second electrode pad, 207*bd*, 207*bu*: leg, 209, •209*a*, •209*b*, •229, •229*a*, •229*b*: solder, 211, •211*a*, •211*b*, •231, •231*a*, •231*b*: gauge lead, 213, 233: elastic body, 215, 235: insulating layer

The invention claimed is:

1. A coupling structure for an electrode pad configured to electrically couple the electrode pad, to which a gauge lead is coupled, to a tab of a strain gauge disposed on an elastic body and comprising a gauge grid and the tab, wherein the coupling structure has an insert structure in which one of the tab and the electrode pad is partially or entirely inserted into another of the tab and the electrode pad.

2. The coupling structure for the electrode pad according to claim 1, wherein the electrode pad having a section of a U shape is disposed on the elastic body so that an opening of the U shape is located on a lateral side, and wherein the tab is inserted into the electrode pad having the U shape.

3. The coupling structure for the electrode pad according to claim 2, wherein the gauge grid comprises straight-line portions each extending in a predetermined first direction, and wherein both legs of the electrode pad having the U shape extend in the first direction, and the tab enters the electrode pad having the U shape in the first direction.

4. The coupling structure for the electrode pad according to claim 1, wherein the tab has long holes each having a longitudinal direction extending in a predetermined second direction and penetrating through the tab in a thickness direction of the tab or grooves recessed in the thickness direction of the tab, and wherein the electrode pad has a comb-like sectional shape, and comb teeth of the electrode pad enter the long holes or the grooves.

5. The coupling structure for the electrode pad according to claim 4, wherein the gauge grid comprises straight-line portions each extending in a predetermined first direction, and wherein the second direction extends in a same direction as the first direction.

6. The coupling structure for the electrode pad according to claim 1, wherein the strain gauge is disposed on the elastic body with an insulating layer interposed, and wherein the electrode pad is formed in contact with the tab and the insulating layer.

7. The coupling structure for the electrode pad according to claim 1, wherein the strain gauge is made of Cr—N and the electrode pad is made of Au.

* * * * *